United States Patent
Yeh et al.

(10) Patent No.: US 12,191,698 B2
(45) Date of Patent: Jan. 7, 2025

(54) POWER MANAGEMENT FOR REMOVABLE BATTERIES

(71) Applicant: Google LLC, Mountain View, CA (US)

(72) Inventors: Chia Hang Yeh, Campbell, CA (US); Hsing-Sheng Lin, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 143 days.

(21) Appl. No.: 17/768,775

(22) PCT Filed: Apr. 13, 2021

(86) PCT No.: PCT/US2021/027071
§ 371 (c)(1),
(2) Date: Apr. 13, 2022

(87) PCT Pub. No.: WO2022/220801
PCT Pub. Date: Oct. 20, 2022

(65) Prior Publication Data
US 2023/0146458 A1    May 11, 2023

(51) Int. Cl.
*H02J 7/00*    (2006.01)
*G02C 5/14*    (2006.01)
(Continued)

(52) U.S. Cl.
CPC ........ *H02J 7/007182* (2020.01); *G02C 5/143* (2013.01); *G02C 11/10* (2013.01);
(Continued)

(58) Field of Classification Search
CPC .......... H02J 1/10; H02J 1/001; H02J 7/00304; H02J 7/0031; H02J 7/0014; H02J 7/0024; H02J 7/007182; H02J 7/342; G06F 1/263
See application file for complete search history.

(56) References Cited

U.S. PATENT DOCUMENTS

| | | |
|---|---|---|
| 2014/0009106 A1 | 1/2014 | Andrea |
| 2018/0262023 A1* | 9/2018 | Li ..................... H02J 7/007182 |
| 2020/0127483 A1* | 4/2020 | Kim ....................... H02J 7/0029 |

FOREIGN PATENT DOCUMENTS

| | | |
|---|---|---|
| CN | 209879147 U | 12/2019 |
| CN | 210401836 U | 4/2020 |

(Continued)

OTHER PUBLICATIONS

Hommalai et al., "Battery Monitoring System by Detecting Dead Battery Cells," IEEE, 2015, 5 pages.
(Continued)

*Primary Examiner* — Ryan Johnson
(74) *Attorney, Agent, or Firm* — Brake Hughes Bellermann LLP

(57) ABSTRACT

An electronic device may include a power management subsystem that soft-starts freshly charged batteries upon connection. The device may be configured to operate on power from a number of batteries less than the greatest number of batteries that may be concurrently connected. Because the soft-start reduces current inrush upon connection of a fresh battery, the device may continue operating as fresh batteries are connected and depleted batteries are disconnected.

19 Claims, 5 Drawing Sheets

(51) Int. Cl.
  *G02C 11/00*  (2006.01)
  *G06F 1/26*   (2006.01)
  *H02J 1/10*   (2006.01)
  *H02J 7/34*   (2006.01)

(52) U.S. Cl.
  CPC ............... *G06F 1/263* (2013.01); *H02J 1/10* (2013.01); *H02J 7/0013* (2013.01); *H02J 7/0014* (2013.01); *H02J 7/0024* (2013.01); *H02J 7/00304* (2020.01); *H02J 7/0031* (2013.01); *H02J 7/005* (2020.01); *H02J 7/342* (2020.01)

(56) References Cited

FOREIGN PATENT DOCUMENTS

| | | | |
|---|---|---|---|
| EP | 3271993 A1 | | 1/2018 |
| EP | 3376632 A1 | | 9/2018 |
| JP | 2018078126 A | * 5/2018 | .......... H01M 2/1022 |
| KR | 20130071950 A | | 7/2013 |
| KR | 20170002298 A | * 1/2017 | |

OTHER PUBLICATIONS

"A New Power Bank for your Google Glass, TM" http://gazerg.com/GazerG, retrieved from the internet Dec. 2, 2020.
International Search Report and Written Opinion for International Application No. PCT/US2021/027071 dated Oct. 6, 2021. 13 pages.
"Hands-Free Working With Smart Glasses" retrieved from the internet Dec. 1, 2020.

\* cited by examiner

POWER MANAGEMENT FOR REMOVABLE BATTERIES

CROSS-REFERENCE TO RELATED APPLICATION

The present application is a national phase entry under 35 U.S.C. § 371 of International Application No. PCT/US2021/027071, filed on Apr. 13, 2021, the entire disclosure of which is incorporated herein by reference.

BACKGROUND

Portable electronic devices are generally powered by on-board batteries. Such batteries have limited capacities, and therefore provide the electronic devices with a finite amount of power which limits the operating time of the device. When such batteries are exhausted, they must either be replaced with fresh batteries or be connected to a power source to charge. If batteries are removed from the device to be replaced, the device typically powers down. Some electronic devices may have charging circuitry that enables batteries to be charged without the need to shut down the device. However, the electronic device ceases to be portable when connected to a power source to charge its batteries using the charging circuitry. In either case, the use of a portable electronic device is interrupted whenever its batteries run low. Interruption for charging at a power source can be particularly disruptive in the case of smart glasses with prescription lenses since the wearer may be reliant on the lenses.

Typically, batteries powering an electronic device should be maintained at roughly equal levels of charge. An uneven charge between batteries may result in an inrush of current when a relatively fresh battery is connected in parallel to a relatively depleted battery. Such an inrush of current may damage the circuitry of the electronic device. Moreover, powering an electronic device using batteries having different charge levels may be inefficient. For instance, the battery having a higher charge level may be depleted more quickly than the battery having a lower charge level. Additionally, the battery having a lower charge level may have a higher resistance than the battery with the higher charge level, which may cause the battery with the lower charge level to overheat or otherwise become damaged. Further, inrush current may trigger overcurrent protection in the hardware, which may interrupt the intended operation of the device. To avoid these issues, typically all batteries are replaced at the same time to assure similar charge levels between all of the batteries. In situations where rechargeable batteries are used, a user may have to wait until a full set of batteries are completely charged to be certain that each battery in the set carries an equal charge. The requirement for equally charged batteries can thus extend interruptions to the use of portable electronic devices.

BRIEF SUMMARY

Aspects of this disclosure are directed to power management systems for electronic devices. The power management system may allow for a battery of an electronic device to be replaced while the electronic device remains powered by another battery. The power management system may also be configured to manage batteries having different levels of charge.

In one aspect, a power delivery system may comprise a battery connection, and a soft-start circuit connected to the battery connection and a main power bus. The soft-start circuit may be configured to provide increasing levels of power to the main power bus when a battery having a voltage level higher than a voltage level on the main power bus is connected to the battery connection, and prevent power delivery to the main power bus from the battery when the voltage level of the battery is less than the voltage level on the main power bus.

In some arrangements according to any of the foregoing, the battery connection may be a first battery connection, the soft-start circuit is a first soft-start circuit, and the battery is a first battery, and the system may further comprise a second battery connection, and a second soft-start circuit connected to the battery connection and the main power bus. The second soft-start circuit may be configured to provide increasing levels of power to the main power bus from the second battery connection when a second battery having a voltage level higher than a voltage level on the main power bus is connected to the second battery connection, and stop power delivery from the second battery to the main power bus when the voltage level of the second battery is less than the voltage level on the main power bus.

In some arrangements according to any of the foregoing, the soft start circuit may include an output transistor, and the provision of power to the power bus is through the output transistor.

In some arrangements according to any of the foregoing, the output transistor may be a field effect transistor, and a voltage at a gate of the output transistor is a function of a voltage at the battery connection and a voltage at the power bus.

In some arrangements according to any of the foregoing, the soft start circuit may further comprise an operational amplifier and a governance transistor, wherein the battery connection is wired to a first input of the operational amplifier, the power bus is wired to a second input of the operational amplifier, the output of the operational amplifier is wired to a gate of the governance transistor, and a drain of the governance transistor is wired to the gate of the output transistor.

In some arrangements according to any of the foregoing, the gate of the output transistor and the first input of the operational amplifier may be wired in parallel to the respective battery connection.

In some arrangements according to any of the foregoing, the output transistor may be an n-channel transistor and the governance transistor is a p-channel transistor.

In some arrangements according to any of the foregoing, an electronic system may comprise any of the foregoing power management systems and a charging pod for charging batteries connectable to the battery connections.

In some arrangements according to any of the foregoing, a wearable smart glasses device may comprise any of the foregoing power management systems.

In some arrangements according to any of the foregoing, the smart glasses may include two temple tips, each of the two temple tips including one or more batteries.

In some arrangements according to any of the foregoing, the temple tips may each be independently removable from the electronic device.

In some arrangements according to any of the foregoing, an electronic system may comprise any of the foregoing smart glasses devices and a charging pod including a wireless charging coil configured to receive one or more of the two temple tips and charge the one or more batteries.

In another aspect, an electronic device may comprise a first electrical connection, a second electrical connection, wherein each of the first electrical connection and the second electrical connection includes a battery connection, and an integrated circuit having stored thereon software instructions that, when executed, will cause the integrated circuit to restrict current draw from a battery connected to the first electrical connection or second electrical connection if the voltage of the battery exceeds a threshold voltage.

In another aspect, a power delivery system may comprise a first electrical connection, a second electrical connection, wherein each of the first electrical connection and the second electrical connection includes a battery connection, and an integrated circuit having stored thereon software instructions that, when executed, will cause the integrated circuit to restrict current draw from a battery connected to the first electrical connection or second electrical connection if the voltage of the battery exceeds a threshold voltage while allowing an electronic device comprising the power delivery system to be maintained powered by one or more batteries connected to the other electrical connection.

In some arrangements according to any of the foregoing, the device may further comprise two soft start switches controlled by the integrated circuit, each soft start switch associated with a respective one of the battery connections so as to be able to limit current draw from the respective one of the battery connections.

In some arrangements according to any of the foregoing, the device may further comprise a gas gauge associated with each of the battery connections and the governance of the current drawn from the battery connections may include monitoring the gas gauges.

In some arrangements according to any of the foregoing, the power delivery system may further comprise a gas gauge associated with each of the battery connections and the integrated circuit may be configured to monitor the gas gauges for a governance of a current draw from batteries connected to the first and second electrical connections.

In some arrangements according to any of the foregoing, the integrated circuit may be configured to send an error message to an output device if a battery having a voltage below a predefined threshold is connected within either of the battery connections.

In some arrangements according to any of the foregoing, the instructions, when executed, may further cause the integrated circuit to decrease the restriction of current draw as time elapses after connection of a battery carrying a voltage exceeding the threshold.

In some arrangements according to any of the foregoing, the instructions, when executed, may further cause the integrated circuit to decrease the restriction of current draw gradually.

In some arrangements according to any of the foregoing, the threshold may be a predefined threshold.

In some arrangements according to any of the foregoing, the battery may be a first battery and the threshold is a voltage of a second battery connected to the second battery connection.

In some arrangements according to any of the foregoing, the restriction of current draw may be directly related to a difference between the voltage of the first battery and the threshold.

In another aspect, a power delivery system according to any one of the foregoing arrangements may comprise at least one additional battery connection and at least one additional soft-start circuit connected to the at least one additional battery connection and the main power bus. The at least one additional soft-start circuit may be configured to provide increasing levels of power to the main power bus when a battery having a voltage level higher than a voltage level on the main power bus is connected to the at least one additional battery connection. The at least one additional soft-start circuit may also be configured to prevent power delivery to the main power bus from the battery connected to the at least one additional battery connection when the voltage level of this battery is less than the voltage level on the main power bus.

In some arrangements according to any of the foregoing, the restriction of current draw may be based on a difference between the voltage of a first battery connected to the first electrical connection and a threshold voltage for a second battery connected to the second battery connection.

In another aspect, an electronic device may comprise a power delivery system according to any of the foregoing arrangements.

In some arrangements according to any of the foregoing, the electronic device may be a wearable smart glasses device.

In some arrangements according to any of the foregoing, the electronic device may comprise two temples for wearing the electronic device on a head of a user, and each temple may comprise a temple tip including one or more batteries.

In some arrangements according to any of the foregoing, the temple tips may each be independently removable from the electronic device.

In another aspect, an electronic system may comprise an electronic device according to any of the foregoing arrangements, and a charging pod for charging one or more batteries that are connectable to a battery connection of the electronic device.

In some arrangements according to any of the foregoing, the charging pod may include a wireless charging coil.

In some arrangements according to any of the foregoing, the charging pod may be configured to charge one or more batteries of a temple tip of the electronic device.

DETAILED DESCRIPTION

Overview

Figure 1:
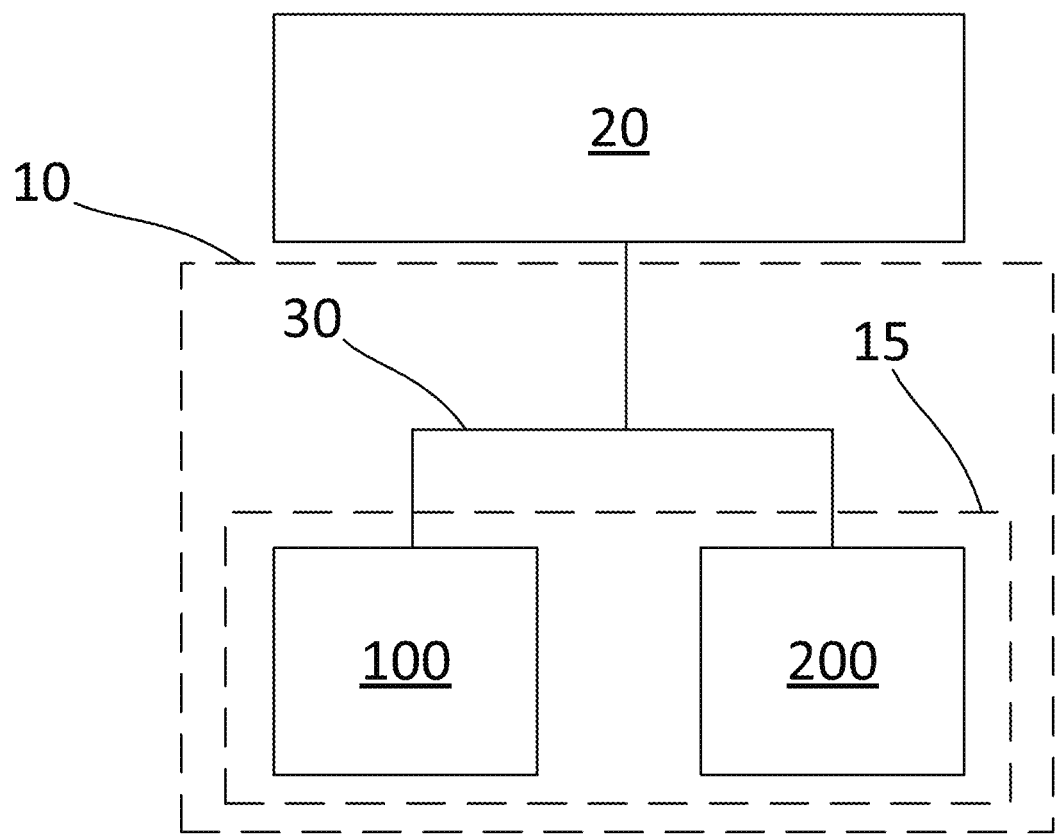
FIG. 1 is a schematic representation of an electronic device connected to a power delivery system according to an aspect of the disclosure.

The present disclosure is directed to a power delivery system that allows for safe replacement of a battery of an electronic device to be replaced Each battery may simultaneously provide power to the electronic device through the power delivery system. When a battery is depleted or otherwise has a low charge level, the battery may be removed from the electronic device and replaced with a battery having more charge, such as a freshly charged battery. As the power delivery system provides power to the electronic device from multiple batteries connected in parallel when one of the batteries is removed the power delivery system may continue to provide power from the remaining batteries to the electronic device.

The present disclosure avoids the need for equally charged batteries for safe operation of a battery powered device. According to some aspects, this may be accomplished by configuring the device to soft-start a battery upon connection to the device, when the battery being connected has relatively more charge than the one or more other batteries powering the device. The device may also be configured to stop drawing from a battery that has a relatively low charge relative to the one or more other batteries, so as to draw only from the batteries having greater charge until the batteries are at a relatively equal charge. The above described functionality may enable a battery to be replaced while the electronic device remains powered by another battery. In this regard, the power delivery system of the electronic device may include two or more batteries connected in parallel.

A power management subsystem may be configured to balance the current drawn from the batteries when powering an electronic device. The power management subsystem may inhibit the current draw from a battery having a relatively greater charge. The inhibition may be a function of a difference in charge between two batteries. The power management subsystem may be, for example, a programmable integrated circuit (PIC). In one exemplary embodiment, instructions stored on the PCI may, when executed, cause the integrated circuit to restrict current draw from a battery connected to the first electrical connection or second electrical connection if the voltage of the battery exceeds a threshold voltage. This may for example include instructions to monitor gas gauges of the batteries and adjust current drawn therefrom. Alternatively, the power management subsystem may be a hardware circuit at each battery connection that is constructed to open or close a field effect transistor to varying degrees depending on the proportion of the voltage across the battery to the voltage at a power bus for the other systems of the device.

As used herein the term "electronic device" may include any device capable of being at least partially powered by one or more batteries. For example, an electronic device may be a tablet computer, laptop computer, mobile phone, earphones, wearable devices, such as smart watches, fitness trackers, health monitors, smart fashion, etc. As further described herein, the electronic device may be a pair of smart glasses. The smart glasses may include a battery slot at each temple tip. The battery slots may be connected in parallel to the electronics of the device such that the device may continue to operate when one battery is removed. The device may be provided with a battery charging pod and at least one spare battery so that the device may operate indefinitely. The charging pod may be capable of charging the batteries wirelessly, such as by the inclusion of at least one charging coil for inductive charging.

Example Systems

FIG. 1 illustrates an electronic device 20 connected to a power delivery system 10. The electronic device is connected to a first soft-start circuit 100 and second soft-start circuit 200 via a power bus 30. As described herein, each soft-start circuit may include a power source, such as one or more batteries that deliver power to the electronic device through the power bus 30. Although not shown, electronic device 20 may include any number of components, circuits, or subsystems, any of which may be independent of one another or grouped within systems or subsystems themselves.

As further shown in FIG. 1, the power bus 30 may receive power through a power management subsystem 15 of power delivery system 10, provided collectively by the first soft-start circuit 100 and a second soft-start circuit 200. Although FIG. 1 illustrates only two soft-start circuits, any number of soft-start circuits may be included in the power delivery system 10. The power management subsystem 10 is illustrated as including two soft-start circuits 100, 200 by way of example only. In this regard, the power management subsystem may include any number of soft-start circuits. Each soft-start circuit may be similar to first soft-start circuit 100, described in detail below, and may each be connected to a common power bus.

Figure 2:
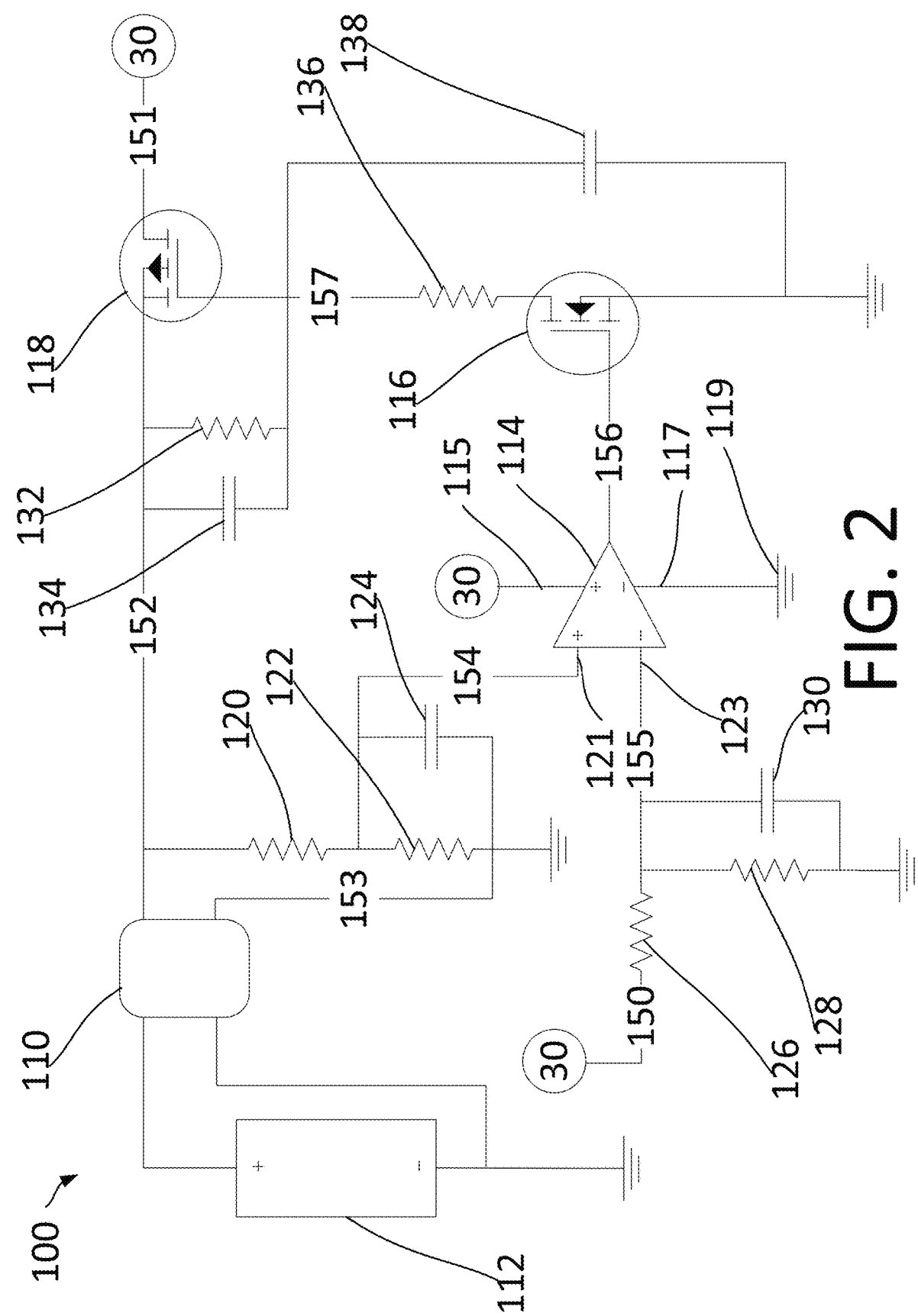
FIG. 2 is a diagram of a soft-start circuit according to an aspect of the disclosure.

FIG. 2 illustrates first soft-start circuit 100. Second soft-start circuit 200 is generally alike to first soft-start circuit 100. That is, the illustration and the following description of the first soft-start circuit 100 may apply to the second soft-start circuit 200. In some instances, power delivery system 10 may be designed such that second soft-start circuit 200 differs from first soft-start circuit 100 in some ways, such as with more or fewer components. Likewise, where a device includes more than two soft-start circuits, each additional soft-start circuit may be compared with first soft-start circuit 100, without necessarily being identical to soft-start circuit 100.

As shown in FIG. 2, first soft-start circuit 100 includes a battery connection 110 at which a (first) battery 112 may be connected. Battery 112, though illustrated in FIG. 2 as being integrated into the soft-start circuit 100, may be removable from the first soft-start circuit 100. Moreover, although only a single battery 112 is shown, any number of batteries, such as a battery pack containing multiple batteries, may be connected to the battery connection 110.

First soft-start circuit 100 is configured to compare the voltage of the battery 112 to the voltage on power bus 30. In this regard, the first soft-start circuit 100 measures the voltage on power bus 30 to the voltage of the battery 112. The first soft-start circuit 100 may measure the voltage on the bus measuring line 150 to determine the voltage of the power bus 30. The first soft-start circuit may control the power output by the battery 112 onto power out line 151 dependent on the outcome of the comparison.

In the example illustrated in FIG. 2, first soft-start circuit 100 will effectively disconnect battery 112 from power bus 30 when the voltage on power bus 30 exceeds the voltage of battery 112. By disconnecting batteries holding relatively low charge, soft-start circuits 100, 200 will protect those batteries and the efficiency of the system, as current will be prevented from flowing from power bus 30 to a battery of lower voltage. In some arrangements, the soft-start circuits 100, 200 may be implemented with a tolerance allowing a battery to remain connected until a difference or ratio between the power bus 30 voltage and the battery voltage reaches a minimum threshold. Such tolerance may be provided by, for example, modifying comparison lines 154, 155, described below, or by adding a Schmitt Trigger circuit to the soft-start circuits 100, 200.

The first soft-start circuit 100 will restrict power from battery 112 to power bus 30 when the voltage of battery 112 exceeds the voltage on power bus 30. When the voltage of battery 112 exceeds the voltage on power bus 30, the degree to which first soft-start circuit 100 restricts connection between battery 112 and power bus 30 will increase as the difference between the voltages increases. That is to say, the amount of power output by the battery 112 onto the power bus 30 may be prevented or limited when the voltage of the battery 112 is larger than the voltage on the power bus 30. Soft-start circuits 100, 200 according to the illustrated example will therefore protect depleted batteries and the efficiency of the device by preventing unintended rushes or redirection of current as batteries with a higher charge are connected. By restricting output from batteries carrying a higher voltage than power bus 30, soft-start circuits 100, 200 will also protect main system 20 from inrush current when a freshly charged battery is connected. Since the restriction of the connection has a direct relationship with the amount that the voltage of a battery exceeds the voltage on power bus 30, the restriction will decrease over time, as further described herein.

The first soft-start circuit 100 will provide an unobstructed connection between battery 112 and power bus 30 when the voltage of battery 112 equals the voltage on power bus 30. The soft-start circuits 100, 200 may be modified from the numerical ratios stated herein and the arrangement illustrated in FIG. 2 to allow unobstructed connection between battery 112 and power bus 30 when the voltage of battery 112 differs slightly from voltage on power bus 30 as well. The amount of difference tolerable for unobstructed connection depends, at least in part, on the chemistry and type of battery 112. Any plural number of soft-start circuits according to the following description of first soft-start circuit 100 may therefore be connected to a common power bus 30 to enable batteries at various levels of charge to be safely connected or disconnected from respective soft-start circuits without interrupting operation of main system 20.

To accomplish the above described comparison between the voltage of battery 112 and the voltage on the power bus 30, positive comparison line 154 and negative comparison line 155 are connected to a positive input 121 and a negative input 123, respectively, of an operation amplifier (op-amp) 114 of the first soft-start circuit 100. The positive power supply terminal 115 of op-amp 114 is connected to power bus 30, while the negative power supply terminal 117 of op-amp 114 goes to ground 119. As such, op-amp 114 is powered by power bus 30. Although a number of grounds are shown in FIG. 2, for clarity only ground 119 is labeled.

Positive comparison line 154 is connected to a voltage divider formed between battery out line 152 and battery ground line 153. As shown in FIG. 2, battery out line 152 is connected to battery connection 110 and battery ground line 153 is connected to ground. The voltage divider is formed by resistor 120 and resistor 122. The resistors may be sized such that the voltage between resistor 120 and resistor 122 is within the operating parameters of the op-amp 114. For instance, resistor 120 may be 10 kiloohm (K) and resistor 122 may be 1 K. Resistors 120 and resistor 122 are arranged in series to act as a voltage divider between battery out line 152 and battery ground line 153.

Positive comparison line 154 is connected between resistors 120, 122, and thus carries a fraction of the voltage of battery 112. Capacitor 124, for which a suitable capacitance may be 1 microfarad (µF), is arranged in parallel with resistor 122 to act as a filter. Voltage on positive comparison line 154 and into positive input 121 will therefore be generally proportional to voltage across battery 112.

Similarly, negative comparison line 155 is connected to bus measuring line 150 to carry a fraction of the voltage on the bus measuring line 150. Resistor 126 and resistor 128, for which suitable resistances are 10.1 K and 1 K, respectively, are arranged in series between bus measuring line 150 and ground to act as a voltage divider. Negative comparison line 155 is connected between resistors 126, 128, and thus carries a fraction of the voltage of power bus 30. Capacitor 130, for which a suitable value is 1 µF, is arranged in parallel with resistor 128 to act as a filter. The voltage on negative comparison line 155 and into negative input 123 will therefore be generally proportional to the voltage on power bus 30.

The positive input 121 and negative input 123 to op-amp 114 are therefore proportional to the voltages of battery 112 and power bus 30, respectively. As such, the output from op-amp 114 will vary as the relationship between the voltages of battery 112 and power bus 30 varies.

Op-amp 114 outputs on op-amp output line 156 to a gate of a governance transistor 116, which is a normally off transistor that will turn on as voltage at its gate increases beyond voltage at its source. In the illustrated example, governance transistor 116 is an enhancement type N-channel metal oxide semiconductor field effect transistor (MOSFET). The source of governance transistor 116 is connected to ground, so the drain-source conductivity of governance transistor 116 will largely depend on the output of op-amp 114.

A governing line 157 connects the drain of governance transistor 116 to the gate of an output transistor 118, which is a normally off transistor that will turn on as the voltage at its gate falls below the voltage at its source. In the illustrated example, output transistor 118 is an enhancement type P-channel MOSFET. Battery out line 152 is connected to the source of output transistor 118 and, through a resistor 132, to governing line 157. Voltage on governing line 157 is thus proportional to the voltage of battery 112 at a magnitude depending on the degree to which governance transistor is turned on, which in turn depends on the relationship between the voltages of battery 112 and power bus 30. Power out line 151 connects the drain of output transistor 118 to power bus 30. Thus, the connection between battery 112 and power bus 30 is throttled by output transistor 118 by an amount depending on the relationship between the voltages of battery 112 and power bus 30. Specifically, output transistor 118 will be completely off when the voltage on power bus 30 exceeds the voltage of battery 112, output transistor 118 will be completely on when the voltage on power bus 30 equals the voltage of battery 112, and when the voltage of battery 112 exceeds the voltage on power bus 30, output transistor 118 will be partially on to a degree that is inversely proportional to the difference between voltages.

As shown, first soft-start circuit 100 includes resistors and capacitors. Numerical values for suitable resistances and capacitances of these elements are set forth herein. Such values are suitable at least for a battery 112 with capacity for, for example, equal to or about 3.8 volts at maximum charge. Such values are merely examples and may differ in other arrangements according to the present disclosure. For example, the values may be increased or decreased in proportion with one another. For that reason, the disclosed values also indicate suitable ratios between the resistances and capacitances of the elements of first soft-start circuit 100. Individual values may also be varied without entirely altering the function of first soft-start circuit 100. For each resistance or capacitance described herein, values greater or less than the stated value by 10% of the stated value are also within the scope of the disclosure. All ratios between values resulting from such variation of individual values are also contemplated.

Resistor 132 and resistor 136, for which suitable resistances are 100 K and 10 K, respectively, are arranged in series between battery out line 152 and governance transistor 116 to act as a voltage divider. Governing line 157 is connected between resistors 132, 136, and thus carries a fraction of the voltage of battery out line. Capacitor 134, for which a suitable capacitance is 0.01 µF, is arranged in parallel with resistor 132 to act as a filter. Capacitor 138, for which a suitable capacitance is 0.47 µF, is also connected in parallel with resistor 136 and across the drain and source of governance transistor 116, to act as another filter.

Figure 3:
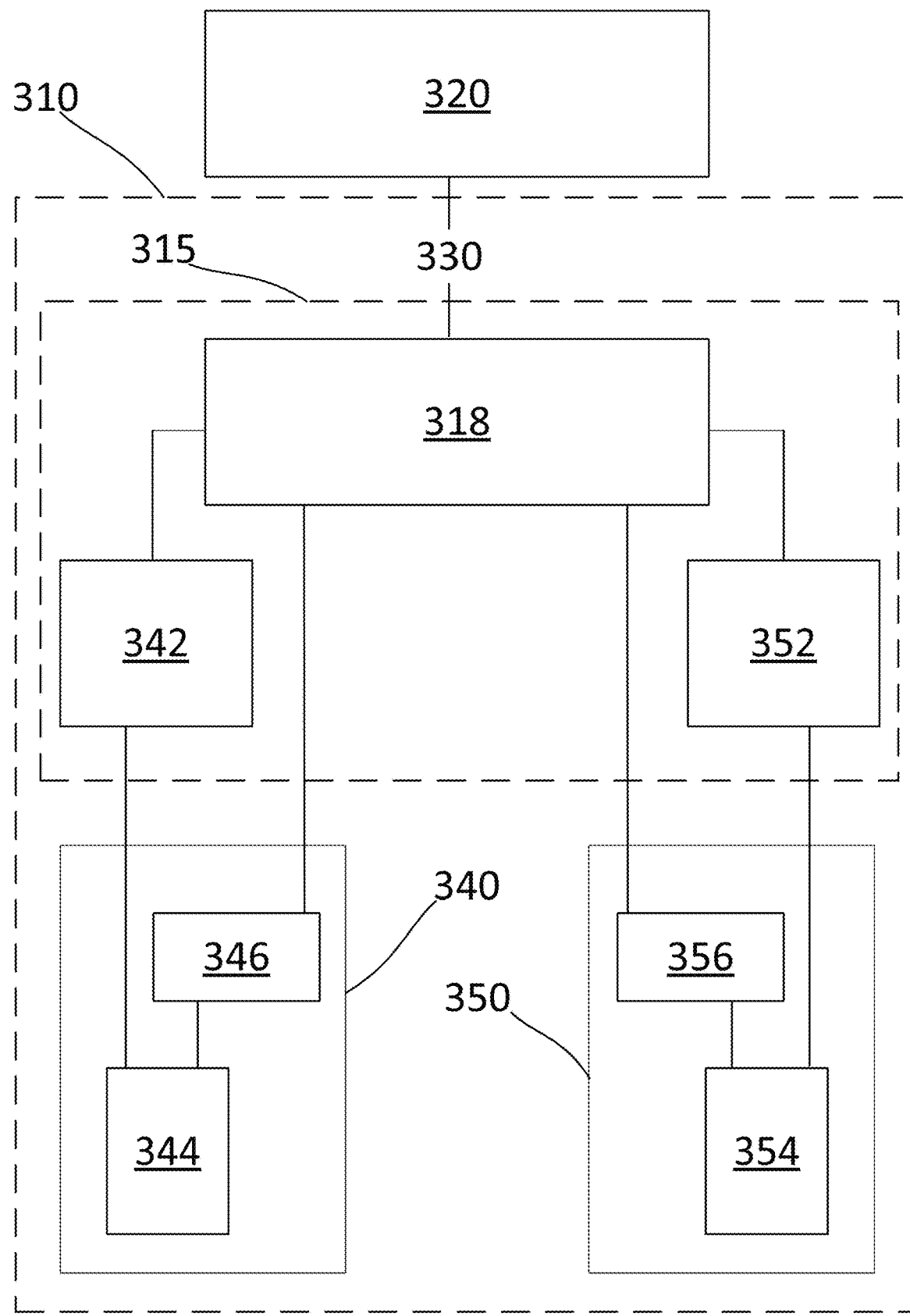
FIG. 3 is a schematic representation of an electronic device connected to a power delivery system according to an aspect of the disclosure.

FIG. 3 illustrates another electronic device 320 connected to a power delivery system 310. As illustrated, the electronic device is connected to the power delivery system via power bus 330. Power is supplied to bus 330 by a power management subsystem 315 including a programmable integrated circuit (PIC) 318, first soft start switch 342, and second soft start switch 352. The first soft start switch 342 is controllable by PIC 318 to throttle power drawn from a removable first battery 340, and second soft start switch 352 is controllable by PIC 318 to throttle power drawn from a removable second battery 350. The power delivery system is illustrated with two soft-start switches 342, 352 and two batteries 340, 350 by way of example only, and alternative arrangements may have any plural number of soft-start switches and batteries generally like those described here.

First battery 340 includes a first cell 344 and a first gas gauge 346, and second battery 350 includes a second cell 354 and a second gas gauge 356. Gas gauges 346, 356 measure charge held by their respective cells 344, 354, such as through temperature measurements. PIC 318 may monitor gas gauges 346, 356, and thereby the charge held by cells 344, 354.

PIC 318 may include a processor and a non-transitory computer readable memory medium carrying instructions that, when executed, cause PIC 318 to read gas gauges 346, 356 and control soft-start switches 342, 352 to prevent unintended current rushes or redirections as batteries 340, 350 are connected or disconnected, without interruption to the operation of main system 320 as long as at least one battery 340, 350 carrying sufficient charge remains connected, in a manner similar to that described above with regard to soft-start circuits 100, 200.

In one example, PIC 318 may be programmed to control soft-start switches 342, 352 to disconnect a battery 340, 350 carrying a cell 344, 354 with a lower voltage than a voltage on bus 330, as estimated from measurements through gas gauges 346, 356. PIC 318 may be programmed to control soft start switches 342, 352 to, upon connection of a battery 340, 350 carrying a cell 344, 354 with a greater voltage than a voltage on bus 330 as estimated from measurements through gas gauges 346, 354, initially restrict a connection between the cell carrying the higher voltage and the bus 330. PIC 318 may further be programmed to decrease such restriction over time, thus soft-starting the newly connected battery.

Figure 4:
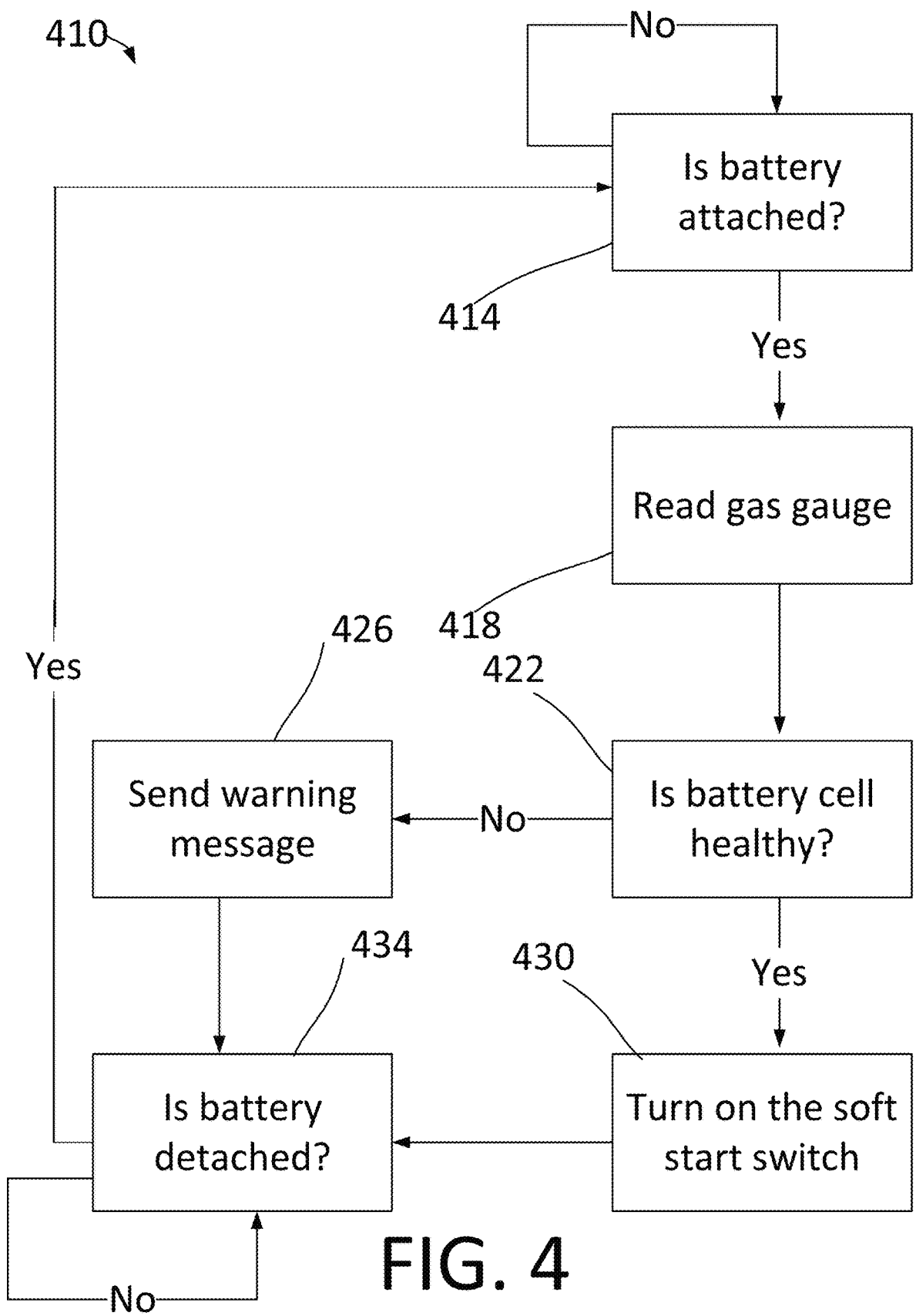
FIG. 4 is a flowchart of logic according to an aspect of the disclosure.

In another example, the memory medium of PIC 318 may carry instructions that, when executed, cause PIC 318 to execute a power management logic illustrated by the flowchart of FIG. 4. The logic 410 may be followed independently with regard to each connection point where a battery, such as batteries 340, 350, may be attached. PIC 318 may begin at step 414 by checking, continuously or at intervals, whether a battery is attached to a given battery connection point. When a battery, such as first battery 340, is detected as connected, PIC 318 will read the gas gauge at step 418, such as first gas gauge 346.

After acquiring the measurement from the gas gauge, PIC 318 will determine whether the battery cell, such as first battery cell 344, is healthy by comparing the gas gauge measurement to a predetermined threshold at step 422. A measurement exceeding the predetermined threshold will indicate that the cell carries a certain minimum amount of charge to be considered "healthy," while a measurement below the predetermined threshold will reveal the battery cell to be "unhealthy." In the illustrated example, if the cell is found unhealthy, PIC 318 may send a warning message at step 426 to a user through an output system or user interface of the electronic device. However, in other arrangements, no warning message is sent.

If the cell is determined to be healthy, PIC 318 will prevent an inrush current by activating the respective soft-start switch at step 430 to restrict connection between the cell and bus 330 by a gradually decreasing amount.

The cell, whether healthy or unhealthy, may then remain connected to bus 330 until the battery holding the cell is detached. The PIC 318 may monitor for detachment of the cell at step 434. After the battery is detached, PIC 318 may return to monitoring the battery connection point at step 414 for connection of a battery.

Figure 5B:
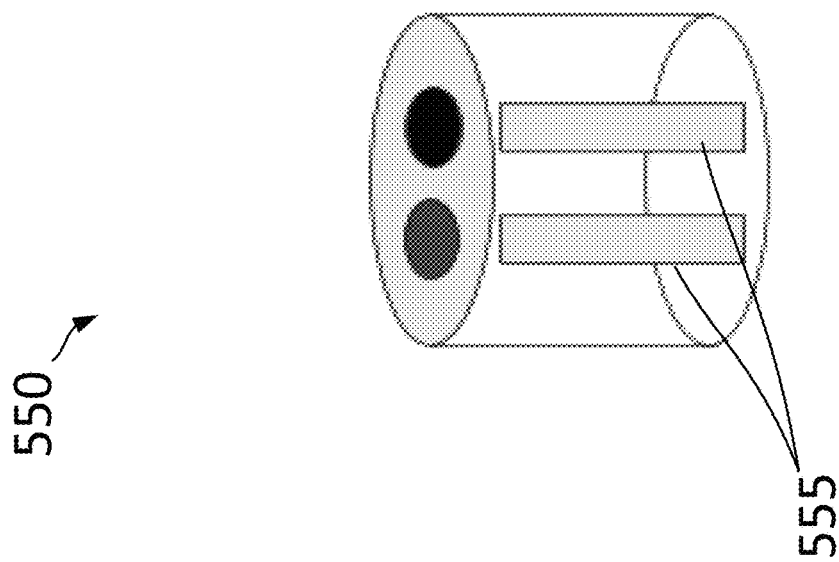
FIG. 5B illustrates a charging accessory usable with aspects of the disclosure.
Figure 5A:
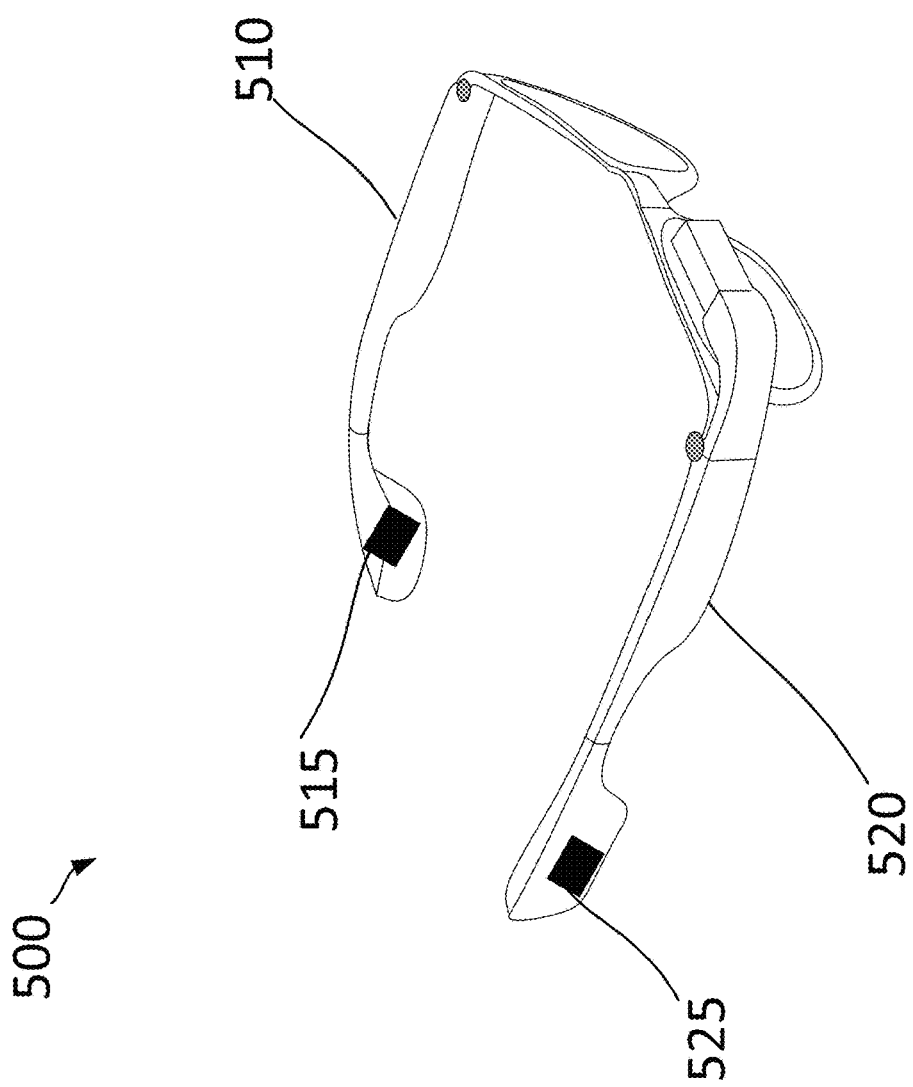
FIG. 5A is a perspective view of an example hardware implementation of aspects of the disclosure.

FIG. 5A illustrates an example of an electronic device 500 wherein any of the foregoing power delivery systems may be implemented. In the illustrated example, device 500 is a pair of smart glasses. In the illustrated example, the device may include any operating hardware typical of smart glasses, such as user interface systems, a projector, a microphone, a speaker, a camera, a radio, wireless communication systems, or any combination of the foregoing.

Smart glasses 500 include a left temple 510 and a right temple 520, which end, respectively, in a left temple tip 515 and a right temple tip 525. Battery connections or connection points according to the above described power delivery systems 10, 310 and power management subsystems 15, 315 may be located anywhere in the smart glasses 510, with, in some examples, each of the temple tips 515, 525 including one connection or connection point. The soft-start circuits 100, 200 or soft-start switches 342, 352 may also each be included in a respective one of the temple tips 515, 525, or elsewhere within a respective one of the temples 510, 520, or anywhere else in the smart glasses 500.

Batteries may be removably connected to the connections or connection points within temple tips 515, 525. In addition or in the alternative, temple tips 515, 525 may be removably connected to the respective temples 510, 520. Thus, in various examples, when a battery needs to be replaced, a user may replace the battery itself, or may remove the temple tip 515, 525 containing the battery and replace it with a charged temple tip.

FIG. 5B illustrates a charging pod 555 that may be used with smart glasses 500 or any other implementation of the above described power delivery system 10, 310 and power management subsystems 15, 315. Charging pod 550 according to the illustrated arrangement includes two charging slots 555 for receiving and charging a 112 or a battery 340, 350 (referred to generically as "batteries" below) according to the foregoing arrangements 10, 310. However, in alternative examples, charging pod 550 may have only one charging slot 555, or any other natural number quantity of charging slots 555. Charging pod 550 may be configured to receive power from any suitable power source, such as a typical plug for a wall outlet, or any variety of USB or similar electronic connection.

Charging slots 555 may be any type of apparatus used for charging batteries. In some examples, charging slots 555 are inductive charging coils capable of wirelessly charging the batteries. However, in other examples, charging slots 555 may include electrical contacts for conductively charging the batteries. According to the above described alternative arrangements of the temple tips 515, 525, the charging slots 555 may be configured to receive and charge the batteries alone, or the charging slots 555 may be configured to receive one of the temple tips 515, 525, and to charge the battery contained within or connected to a received temple tip.

Charging pod 550 may be part of a system including electronic device 500, or any device including power delivery systems 10, 310 according to the present disclosure, and at least one rechargeable battery. The system may include, for example, two, three, four, or more batteries. Since the above described power delivery systems 10, 310, enable uninterrupted operation of electronic device 500 as batteries are individually connected or disconnected, as long as one charged battery, or a sufficient minimum number of charged batteries, remains connected to device 500, inclusion of plural batteries in the system enables device 500 to operate indefinitely. Where multiple batteries are provided, one battery may power device 500 while another is charged in pod 550. A charged battery may be connected to device 500 before disconnecting a relatively depleted battery from device 500 and charging the depleted battery with pod 550. Thus, shutdown of device 500 is not necessary.

Although the concept herein has been described with reference to particular examples, it is to be understood that these examples are merely illustrative of the principles and applications of the present concept. It is therefore to be understood that numerous modifications may be made to the illustrative examples and that other arrangements may be devised without departing from the spirit and scope of the present concept as defined by the appended claims.

The invention claimed is:

1. A power delivery system, comprising:
a first battery connection;
a first soft-start circuit connected to the first battery connection and a main power bus, wherein the first soft-start circuit is configured to:
provide increasing levels of power to the main power bus when a first battery having a voltage level higher than a voltage level on the main power bus is connected to the first battery connection, and
disconnect the first battery from the main power bus when the voltage level of the first battery is less than the voltage level on the main power bus;
a second battery connection; and
a second soft-start circuit connected to the second battery connection and the main power bus, the second soft-start circuit configured to throttle power from a second battery.

2. The power delivery system of claim 1, wherein the first soft-start circuit includes an output transistor, and a provision of power to the main power bus is through the output transistor.

3. The power delivery system of claim 2, wherein the output transistor is a field effect transistor, and a voltage at a gate of the output transistor is a function of a voltage at the first battery connection and a voltage at the main power bus.

4. The power delivery system of claim 3, wherein the first soft-start circuit further comprises an operational amplifier and a governance transistor, wherein the first battery connection is wired to a first input of the operational amplifier, the main power bus is wired to a second input of the operational amplifier, an output of the operational amplifier is wired to a gate of the governance transistor, and a drain of the governance transistor is wired to the gate of the output transistor.

5. The power delivery system of claim 4, wherein the gate of the output transistor and the first input of the operational amplifier are wired in parallel to the first battery connection.

6. The power delivery system of claim 4, wherein the output transistor is an n-channel transistor and the governance transistor is a p-channel transistor.

7. The power delivery system of claim 1, wherein the first soft-start circuit and the second soft-start circuit are both controlled by an integrated circuit.

8. The power delivery system of claim 1, wherein the first battery includes a gas gauge configured to measure a charge of the first battery.

9. A power delivery system, comprising:
a first soft-start circuit;
a second soft-start circuit; and
an integrated circuit configured to execute instructions that cause the first soft-start circuit to throttle power from a first battery connected to the first soft-start circuit or throttle power from a second battery connected to the second soft-start circuit,
the first soft-start circuit configured to allow the first battery to remain connected until a difference or ratio between a power bus voltage and a voltage of the first battery reaches a threshold.

10. The power delivery system of claim 9, further comprising a gas gauge associated with the first battery, the integrated circuit is further configured to monitor the gas gauge for a governance of a current draw from the first battery.

11. The power delivery system of claim 9, wherein the integrated circuit is configured to send an error message to an output device if the voltage of the first battery is below a predefined threshold.

12. The power delivery system of claim 9, wherein the instructions, when executed, will further cause the integrated circuit to decrease a restriction of current draw as time elapses after connection of the first battery.

13. The power delivery system of claim 12, wherein the instructions, when executed, will further cause the integrated circuit to decrease the restriction of the current draw gradually.

14. The power delivery system of claim 9, wherein the power from the first battery is restricted in response to the voltage of the first battery exceeding a predefined threshold.

15. The power delivery system of claim 9, wherein the power is restricted based on a difference between the voltage of the first battery and a threshold voltage of the second battery.

16. An electronic device, comprising:
a power delivery system, the power delivery system including:
a first soft-start circuit, and
a second soft-start circuit; and
an integrated circuit configured to execute instructions that cause the first soft-start circuit to restrict power from a first battery connected to the first soft-start circuit or restrict the power from a second battery connected to the second soft-start circuit,
the first soft-start circuit including an operational amplifier having a first input connected to the first battery and having a second input connected to a main power bus.

17. The electronic device of claim 16, the electronic device being a wearable smart glasses device.

18. The electronic device of claim 17, comprising a temple for wearing the electronic device on a head of a user, wherein the temple includes a temple tip including at least the first battery.

19. The electronic device of claim 18, wherein the temple tip is removable from the electronic device.

* * * * *